Patented Jan. 16, 1951

2,538,731

UNITED STATES PATENT OFFICE 2,538,731

METAL OXIDE TREATMENT OF 3-FORMOXY STEROIDS

Robert H. Levin, A. Vern McIntosh, Jr., and George B. Spero, Kalamazoo, Mich., assignors to The Upjohn Company, Kalamazoo, Mich., a corporation of Michigan No Drawing. Application September 15, 1947, Serial No. 774,175

11 Claims. (Cl. 260—397.1)

The present invention relates to a novel process for the selective conversion of a 3-formoxy steroid to a 3-hydroxy steroid, and is especially concerned with a such process for the selective conversion of a 3-formoxy group to a 3-hydroxy group in a steroid containing one or more nuclear substituents in positions other than the C-3 position without affecting the additional substituent group or groups.

It is an object of the present invention to provide a novel process for the conversion of 3-formoxy steroids to 3-hydroxy steroids. A further object of the invention is the provision of a process for the selective conversion of a 3-formoxy group to a 3-hydroxy group in a steroid containing one or more other substituents without affecting the other substituents. An especial object of the invention is the provision of a such process wherein the steroid molecule contains one or more other acyloxy substituents, including formoxy, and these acyloxy substituents, not in the C-3 position, are not converted to hydroxy. Other objects of the invention will become apparent hereinafter.

It has now been found that a steroid compound, i. e., any compound containing the cyclopentanopolyhydrophenanthrene nucleus with or without 10, 13-methyl groups, having a 3-formoxy group, may be converted to a 3-hydroxy steroid by contacting with magnesium or aluminum oxide. The conversion of the 3-formoxy group to a 3-hydroxy group is selectively accomplished upon such contact, as other substituent groups in the steroid nucleus, such as hydroxy, keto, halogen, alkoxy and even acyloxy, including formoxy, at positions other than the C-3 position, are unaffected by the treatment.

The selective transformation of the 3-formoxy group may be accomplished in any steroid containing the same, regardless of the exact structure of the parent compound or side-chain. For example, etiocholanes, ternor-cholanes, bisnor-cholanes, nor-cholanes, cholanes, as well as their unsaturated analogues, and acids, esters, thioesters, alcohol and carbonyl derivatives thereof, are suitable starting materials. The C-17 side-chain may be hydrocarbon in nature or may contain any of the above-mentioned illustrative functional groups. Ethyl 3-formoxy-(delta 5)-cholenate, methyl 3, 12-diformyl-desoxycholate, 3,22-diformoxy - 22 - phenyl - (delta 5) - cholene, 3,17-diformoxy-(delta 5)-androstene, ethyl diformoxy-etiocholanate, methyl 3 - formoxy-11-keto - bisnor - cholanate, 3-formoxy-(delta 5)-cholenic acid, 3-formoxy-24-benzyloxy-cholane, et cetera, may be mentioned as suitable starting materials.

When other substituent groups, e. g., hydroxy, alkoxy, keto, halogen, or even acyloxy, including formoxy, are present in the steroid nucleus or on the side-chain, these are unaffected by the process and the product has a structure identical with that of the starting steroid compound, except that the 3-formoxy has been converted to hydroxy. Even when other acyloxy groups are present, as at the 7, 11, 12 or side-chain carbon atoms, these acyloxy groups, including formoxy, are not converted to hydroxyl by the reagent of the present invention, and selective transformation to hydroxy is accomplished at the C-3 position.

The importance and value of the method of the present invention resides in the possibility of accomplishing the conversion of a 3-formoxy group to a 3-hydroxy group in a steroid nucleus in a simple and facile manner. Moreover, the possibility of first selectively converting the 3-formoxy to a 3-hydroxy in a steroid containing other substituent groups, especially acyloxy groups, and thereafter reacylating the 3-hydroxy with a different group, allows variation among acyloxy groups in the same compound. Likewise, the 3-hydroxy may be oxidized or otherwise treated with production of novel intermediates which are useful in the synthesis of physiologically active compounds.

The reaction of the present invention may be conveniently conducted by providing a metal oxide, e. g., magnesium or aluminum oxide, preferably the latter, in a suitable form, and by contacting the 3-formoxy steroid therewith. The magnesium or aluminum oxide may advantageously be provided in the form of a column, over which the selected 3-formoxy steroid is passed. Any other suitable procedure for contacting the reactants to accomplish the desired reaction may be employed. The time of contact may be varied considerably, in most cases demanding but a few seconds or minutes, while, in other cases, more advantageous results have been found attainable using a contact time up to about three hours. Room temperature is entirely satisfactory for conducting the reaction; gentle heating may sometimes be employed to increase reaction rate. Chromatographic grade of aluminum oxide has been found especially convenient for accomplishment of the objectives of the present invention, and has the advantage of commercial availability, but other grades of metal oxide reagents may be used if desired.

The following examples are given to illustrate the method of the present invention, and are in no way to be construed as limiting.

*Example 1.—Treatment of ethyl 3-beta-formoxy-(delta 5)-thiocholenate*

Two-hundred milligrams of ethyl 3-beta-formoxy-(delta 5)-thiocholenate, M. P. 78.5–81.5 degrees centigrade (prepared by thioethylation of 3-beta-formoxy- (delta 5)-cholenic acid chloride with lead ethyl mercaptide), is dissolved in 8 milliliters of benzene and passed through a 10-gram alumina column. The column is eluted, using the free flow method with 8 milliliter portions of benzene, benzene+.4 per cent methanol, benzene+1 per cent methanol, benzene+2 per cent methanol, benzene+4 per cent methanol, benzene+8 per cent methanol and methanol. The benzene eluate contains 35 milligrams of crystalline material, M. P. 78–82 degrees centigrade (starting material). The methanol fraction contains 135 milligrams of crystalline material, M. P. 95–100 degrees centigrade. After several recrystallizations from absolute alcohol and from hexane, the melting point becomes constant at 105–108 degrees centigrade. An admixture with a sample of ethyl 3-beta-hydroxy-(delta 5)-thiocholenate, M. P. 108.5–110, melts at 108–110 degrees centigrade. An admixture with starting material melts at about 63–100 degrees centigrade.

*Example 2.—Treatment of methyl 3,12-diformoxy-cholanate*

A solution of 1.0 gram of methyl, 3-alpha, 12-alpha-diformoxycholanate, M. P. 81.5–82.5 degrees centigrade, $(alpha)_D^{25} = +99$ degrees, (prepared by treating methyl desoxycholate with 87 per cent formic acid) in 20 milliliters of benzene and one per cent methanol is passed over a 40 gram column of chromatographic grade alumina. The fraction is eluted with benzene and 2 per cent methanol, and a benzene and 4 per cent methanol mixture, weight 878 milligrams; $(alpha)_D^{25} = +77$ degrees. When 778 milligrams of the fraction is dissolved in benzene and chromatographed over a 43 gram column of alumina, 664 milligrams of methyl 3-hydroxy-12-formoxy-cholanate is recovered from the 2 per cent and 4 per cent methanol in benzene fractions. As proof of structure a sample may be oxidized with chromic acid, hydrolyzed, and reesterified to give the known 3-keto-12-alpha-hydroxycholanic acid ester, M. P. 142–145 degrees centigrade.

*Example 3.—Treatment of 3,17-diformoxy-(delta 5)-androstene*

In the same manner as given for Example 2, 3,17-diformoxy-(delta 5)-androstene in benzene is contacted with chromatographic grade of aluminum oxide. On elution with benzene-methanol solvent mixtures, 3-hydroxy-17-formoxy-androstene is obtained and, as proof of structure, oxidized by the Oppenauer technique and then hydrolyzed to testosterone, having a melting point of 153 degrees centigrade.

*Example 4.—Treatment of cholesteryl formate*

Cholesteryl formate (M. P. 94–96 degrees centigrade) is dissolved in methanol and stirred for two hours with a suspension of chromatographic grade aluminum oxide. After separation of the alumina, concentration of the methanol solution and cooling gives crystals of cholesterol, M. P. 146–148 degrees centigrade.

Various modifications may be made without departing from the spirit or scope of the invention, and it is to be understood that we limit ourselves only as defined in the appended claims.

We claim:

1. The method which includes: converting a 3-formoxy group to a 3-hydroxy group in a steroid compound having a saturated A ring by contacting the steroid compound with a metal oxide selected from the group consisting of aluminum and magnesium oxides.

2. The process of claim 1, wherein the compound treated is a (delta 5)-cholene derivative.

3. The process of claim 1, wherein the compound treated is a (delta 5)-thiocholenate.

4. The method which includes: selectively converting a 3-formoxy group to a 3-hydroxy group in a polyacyloxy steroid having a saturated A ring, by contacting the steroid compound with a metal oxide selected from the group consisting of aluminum and magnesium oxides.

5. The method which includes: selectively converting a 3-formoxy group to a 3-hydroxy group in a polyacyloxy steroid having a saturated A ring, without conversion to hydroxyl of acyloxy groups not in the C-3 position, by contacting the steroid compound with a metal oxide selected from the group consisting of aluminum and magnesium oxide.

6. The process of claim 5, wherein the metal oxide is aluminum oxide.

7. The process of claim 5, wherein the metal oxide is chromatographic grade aluminum oxide.

8. The process of claim 5, wherein the compound treated is a diacyloxy cholane derivative.

9. The process of claim 5, wherein the compound treated is a 3,12-diformoxy-cholanate.

10. The process of claim 5, wherein the compound treated is a diacyloxy androstene.

11. The process of claim 5, wherein the compound treated is 3,17-diformoxy-(delta 5)-androstene.

ROBERT H. LEVIN.
A. VERN McINTOSH, Jr.
GEORGE B. SPERO.

REFERENCES CITED

The following references are of record in the file of this patent:

Sabatier, Comptes rend., vol. 154, pp. 49–52 (1913).

Maihle, Caoutchouc et gutta-percha, 22, pages, 12,937–12,939 (1925).